United States Patent
Kaneko et al.

(10) Patent No.: US 10,464,025 B2
(45) Date of Patent: **\*Nov. 5, 2019**

(54) METHOD FOR PRODUCING MOLDED FILTER BODY

(71) Applicants: SHINSHU UNIVERSITY, Nagano (JP); KOTOBUKI TSUSHOU CO., LTD., Fukuoka (JP)

(72) Inventors: Katsumi Kaneko, Nagano (JP); Toshio Takagi, Fukuoka (JP); Katsuyuki Murata, Fukuoka (JP)

(73) Assignees: SHINSHU UNIVERSITY, Nagano (JP); KOTOBUKI TSUSHOU CO., LTD., Fukuoka (JP)

(*) Notice: Subject to any disclaimer, the term of this patent is extended or adjusted under 35 U.S.C. 154(b) by 147 days.

This patent is subject to a terminal disclaimer.

(21) Appl. No.: 15/531,510

(22) PCT Filed: Nov. 19, 2015

(86) PCT No.: PCT/JP2015/082511
§ 371 (c)(1),
(2) Date: May 30, 2017

(87) PCT Pub. No.: WO2016/088560
PCT Pub. Date: Jun. 9, 2016

(65) Prior Publication Data
US 2017/0304779 A1    Oct. 26, 2017

(30) Foreign Application Priority Data
Dec. 4, 2014   (JP) ................. 2014-245907

(51) Int. Cl.
*B01D 71/02*   (2006.01)
*B01D 69/10*   (2006.01)
(Continued)

(52) U.S. Cl.
CPC ......... *B01D 71/021* (2013.01); *B01D 67/006* (2013.01); *B01D 69/10* (2013.01);
(Continued)

(58) Field of Classification Search
None
See application file for complete search history.

(56) References Cited

U.S. PATENT DOCUMENTS

| | | | |
|---|---|---|---|
| 7,993,524 B2 | 8/2011 | Ratto et al. | |
| 9,034,687 B2 | 5/2015 | Sato et al. | |

(Continued)

FOREIGN PATENT DOCUMENTS

| | | | |
|---|---|---|---|
| JP | 2002-097008 | | 4/2002 |
| JP | 2009-073727 A | | 4/2009 |

(Continued)

OTHER PUBLICATIONS

International Preliminary Report on Patentability (IPRP) issued in WO Patent Application No. PCT/JP2015/082511, dated Jun. 15, 2017, 6 pgs.

(Continued)

*Primary Examiner* — Shamim Ahmed
*Assistant Examiner* — Bradford M Gates
(74) *Attorney, Agent, or Firm* — Haynes and Boone, LLP

(57) ABSTRACT

The purpose is to produce a molded filter body using graphene having water passage holes with a desired size by an easy process.

A method for producing a molded filter body having a layer of graphene 2 as a filter medium, includes the steps of: forming a layer of a support 5 on a surface of graphite 1; forming support water passage holes in the layer of the support 5; peeling the layer of the support 5 from the graphite 1 in a state of attaching the layer of graphene 2 on the surface of the graphite 1 to the layer of the support 5; and (Continued)

holding the layer of graphene 2 by heating at a low temperature for a predetermined time in the air containing oxygen at 160 to 250° C. and forming graphene water passage holes.

4 Claims, 8 Drawing Sheets

(51) Int. Cl.
  *B01D 69/12* (2006.01)
  *B01D 67/00* (2006.01)
  *B05D 1/00* (2006.01)
  *B05D 3/00* (2006.01)
  *C01B 32/19* (2017.01)
  *C01B 32/194* (2017.01)

(52) U.S. Cl.
  CPC ............ *B01D 69/12* (2013.01); *B05D 1/005* (2013.01); *B05D 3/007* (2013.01); *C01B 32/19* (2017.08); *C01B 32/194* (2017.08); *B01D 67/0053* (2013.01); *B01D 2325/08* (2013.01); *B01D 2325/24* (2013.01); *B01D 2325/28* (2013.01)

(56) References Cited

U.S. PATENT DOCUMENTS

| | | | | |
|---|---|---|---|---|
| 9,968,890 | B2* | 5/2018 | Kaneko | B01D 69/10 |
| 2010/0025222 | A1 | 2/2010 | Iijima et al. | |
| 2012/0048804 | A1 | 3/2012 | Stetson et al. | |
| 2013/0315816 | A1* | 11/2013 | Watson | B82Y 30/00 |
| | | | | 423/448 |
| 2014/0212818 | A1* | 7/2014 | Kang | G03F 7/20 |
| | | | | 430/325 |
| 2015/0306550 | A1* | 10/2015 | Lee | B01D 71/021 |
| | | | | 210/500.21 |

FOREIGN PATENT DOCUMENTS

| | | |
|---|---|---|
| JP | 2013-107789 A | 6/2013 |
| JP | 2013-144621 A | 7/2013 |
| WO | WO0224573 | 3/2002 |
| WO | WO 2003099717 A | 12/2003 |
| WO | WO 2013/148479 | 10/2013 |
| WO | WO2014177408 | 11/2014 |

OTHER PUBLICATIONS

Jingwei Bai et al., "Graphene nanomesh," Nature Nanotechnology, Nature Publishing Group, London, GB, vol. 5, Mar. 1, 2010, pp. 190-194.

Makarova O V et al., "Microfabrication of freestanding metal structures using graphite substrate," Sensors and Actuators A: Phys, Elsevier BV, NL, vol. 103, No. 1-2, Jan. 15, 2003, pp. 182-186.

Kwanghyun Yoo et al., "Paper; Direct physical exfoliation of few-layer graphene from graphite grown on a nickel foil using polydimethylsiloxane with tunable elasticity and adhesion," Nanotechnology, IPO, Bristol, GB, vol. 24, No. 20, Apr. 19, 2013, pp. 205-302.

Search Report issued in EP Patent Application No. 15866261.9, dated Jun. 22, 2018, 7 pgs.

English Translation of the International Search Report issued by the Japan Patent Office regarding International Application No. PCT/JP2015/082511, dated Feb. 23, 2016, 2 pages.

International Search Report and Written Opinion issued by the Japan Patent Office regarding International Application No. PCT/JP2015/082511, dated Feb. 23, 2016, 8 pages.

Office Action issued in Taiwan Patent Application No. 104138710, dated Jan. 30, 2019, 6 pages.

* cited by examiner (a)

(b)

(a)

(b)

US 10,464,025 B2

METHOD FOR PRODUCING MOLDED FILTER BODY

CROSS REFERENCE

This application is a U.S. national phase application of co-pending international patent application number PCT/JP2015/082511, filed Nov. 19, 2015, which claims priority to Japanese patent application number 2014-245907, filed Dec. 4, 2014, the entire disclosures of which are hereby incorporated herein by reference.

TECHNICAL FIELD

The present invention relates to a method for producing a molded filter body, and particularly relates to a method for producing a molded filter body having a filter using graphene.

BACKGROUND ART

In recent years, as a filter for removing fine particles such as ions from water, other solutions, or gas, a molded filter body employing graphene in which fine water passage holes are formed has been used (Patent Literature 1).

In general, graphene is formed on a surface of copper foil or the like by a chemical vapor deposition (CVD) method (Patent Literature 2). Therefore, in the past, a process called transcription, in which graphene is transferred to a desired support when using the graphene as a molded filter body, was required (Patent Literature 3).

In a transfer process, polymethyl methacrylate (PMMA) is spin-coated on an exposed surface of the graphene formed on a copper foil to form a thin protective film and dried, and then the dried film is floated on a Cu etching solution heated to 50° C. with the copper foil facing downward, and the copper foil is removed.

Next, the thin film of PMMA and graphene is washed with ultrapure water, and is scooped up so as to be placed on a silicon substrate of which the surface has been hydrophilized.

After that, the thin film is scooped up with a desired support made of a resin or the like, and dried, and the protective film of PMMA is removed by repeating the acetone immersion and the IPA dipping alternately several times.

In the end, by drying the support and the graphene, the graphene was able to be transferred to the support.

In such a conventional transfer process, it takes time and labor together with the consumption of chemicals and the like, and the productivity was low.

Further, in a process of forming or removing a coating on a surface of a layer of graphene, and scooping up or detaching with a silicon substrate or the like, the extremely thin graphene was sometimes damaged.

In addition, conventionally, in order to form water passage holes in graphene, a method of heating in the air at a high temperature of around 300 to 500° C., or in a mixed gas of oxygen and inert gas (nitrogen, argon, helium, or the like) has been performed (Patent Literature 1).

However, in this method, not only the film resist supporting graphene is broken by heat, but also due to the hole boring by combustion reaction of graphite, it was difficult to control the reaction, and the sizes of the water passage holes to be formed in graphene were also uneven. Therefore, this method was unsuitable for use for a molded filter body requiring uniform water passage holes.

Further, cinders of a support such as a resin and the like generated during the combustion contaminate graphene, and sometimes deteriorated the performance of the molded filter body.

In addition, there was also an ion-selective filter using carbon nanotube (Patent Literature 4) or carbon nanohorn (Patent Literature 5) other than the graphene (hereinafter, the single-walled carbon nanohorn is abbreviated as SWNH).

As another method of forming water passage holes in the carbon nano-material, there was a method in which a nitrate is attached to a carbon nano-material as an oxygen supply measure, and holes are formed by heating in vacuum or inert gas at 300° C. (Patent Literature 6).

CITATION LIST

Patent Literature

Patent Literature 1: JP 2013-536077 W
Patent Literature 2: JP 2013-144621 A
Patent Literature 3: JP 2013-107789 A
Patent Literature 4: JP 2011-526834 W
Patent Literature 5: WO 2003/099717 A (Re-publication patent)
Patent Literature 6: JP 2009-073727 A

SUMMARY OF INVENTION

Technical Problem

The present invention has been made to solve the above problems, and an object of the present invention is to produce a molded filter body using graphene having water passage holes with a desired size by an easy process.

Solution to Problem

Hereinafter, the solution to the above objects in the present invention will be described.

A first aspect of the present invention is a method for producing a molded filter body having a layer of graphene as a filter medium, including the steps of: forming a layer of a support on a surface of graphite; forming support water passage holes in the layer of the support; peeling the layer of the support from the graphite in a state of attaching a layer of graphene on the surface of the graphite to the layer of the support; and holding the layer of graphene by heating at a low temperature for a predetermined time in the air containing oxygen at 160 to 250° C. and forming graphene water passage holes.

In the present invention, before and after each step, the order of the steps are not limited to the order of the descriptions of the steps. Accordingly, the layer of the support and the layer of the graphene are peeled off from the graphite, and then the support water passage holes may be formed in the layer of the support. Further, the support water passage holes are formed in advance in the layer of the support, and then the support is attached to the graphite, and the layer of the support may be formed on the surface of the graphite.

In a second aspect of the present invention, the support is a negative type photoresist, and the step of forming the support water passage holes in the layer of the support includes a step of exposing a part other than the part to form the support water passage holes of the photoresist.

In a third aspect of the present invention, the step of holding the layer of graphene by heating at a low temperature and forming the graphene water passage holes is performed in the air containing oxygen at 200 to 250° C.

A fourth aspect of the present invention is a method for producing a molded filter body having a layer of graphene as a filter medium, including the steps of: forming graphene water passage holes in a layer of graphene on a surface of graphite; forming a layer of a support on a surface on which the layer of the graphene is present in the graphite; forming support water passage holes in the layer of the support; and peeling the layer of the support from the graphite in a state of attaching the layer of the graphene to the layer of the support.

In the present invention, the step of forming support water passage holes in a layer of a support may be replaced with another step by changing the order before and after the step. Accordingly, the layer of the support and the layer of the graphene are peeled off from the graphite, and then the support water passage holes may be formed in the layer of the support. Further, the support water passage holes are formed in advance in the layer of the support, and then the support is attached to the graphite, and the layer of the support may be formed on the surface of the graphite.

Advantageous Effects of Invention

According to the first aspect of the present invention, a layer of a support is formed on a surface of graphite, the support is peeled off from the graphite in a state of attaching the layer of graphene on a surface of the graphite to the layer of the support, as a result of which the layer of graphene can be easily formed on the support without requiring any steps such as transcription.

In addition, by holding the layer of graphene by heating at a low temperature for a predetermined time in the air containing oxygen at 160 to 250° C. and forming graphene water passage holes, the reaction becomes mild and the control becomes easy, and holes having a desired size can be formed uniformly in the graphene by controlling the length of the heating time. Further, by heating the graphene at a low temperature, the damage of the support can be prevented, therefore, the fouling of the graphene can also be prevented.

According to the second aspect of the present invention, the support is a negative type photoresist, and by including a step of exposing a portion other than the portion to form the support water passage holes of the photoresist in the step of forming the support water passage holes in the layer of the support, a molded filter body can be formed without passing through a transfer process that causes the damage of graphene.

Further, by using a technique of photolithography with which only the part where the support water passage holes are to be formed is not exposed, the size and shape of the support water passage holes to be formed in a resist can be controlled in detail. In this way, while increasing the strength as a support, support water passage holes having a degree of little influence on the ability of the graphene as a filter can be formed in a film resist.

According to the third aspect of the present invention, by performing the step of holding the layer of graphene by heating at a low temperature and forming the graphene water passage holes, in the air containing oxygen at 200 to 250° C., graphene water passage holes can be formed reliably in graphene in a relatively short period of time.

According to the fourth aspect of the present invention, by forming a layer of a support on a surface on which the layer of the graphene is present in the graphite, and peeling the layer of the support from the graphite in a state of attaching the layer of the graphene to the layer of the support, the layer of graphene can be easily formed on the support without requiring any step such as transcription.

Further, by forming graphene water passage holes in a layer of graphene on a surface of graphite and then attaching the resultant layer to a support, and by peeling the layer of the support from the graphite in a state of attaching the layer of the graphene to the layer of the support, a molded filter body having graphene water passage holes can be easily formed.

DESCRIPTION OF EMBODIMENTS

Hereinafter, a method for producing a molded filter body according to a first embodiment of the present invention will be described.

In the molded filter body, graphene is used as a filter.

In the present invention, a layer of a support is formed on a surface of graphite 1, and the support is peeled off from the graphite 1 in a state of attaching the layer of the graphene on the surface of the graphite 1 to the layer of the support, as a result of which a layer of graphene is formed on the surface of the support.

As the graphite 1, it is preferred to prepare graphite with favorable crystallinity.

For example, highly oriented pyrolytic graphite (HOPG), or kish graphite can be used.

In this embodiment, 1 $cm^2$ of HOPG having a thickness of 1 mm is prepared, Scotch tape (registered trademark, manufactured by 3M Company) is stuck and peeled off, the basal surface is peeled off, and the clean surface is prepared so as to be exposed.

Figure 1:
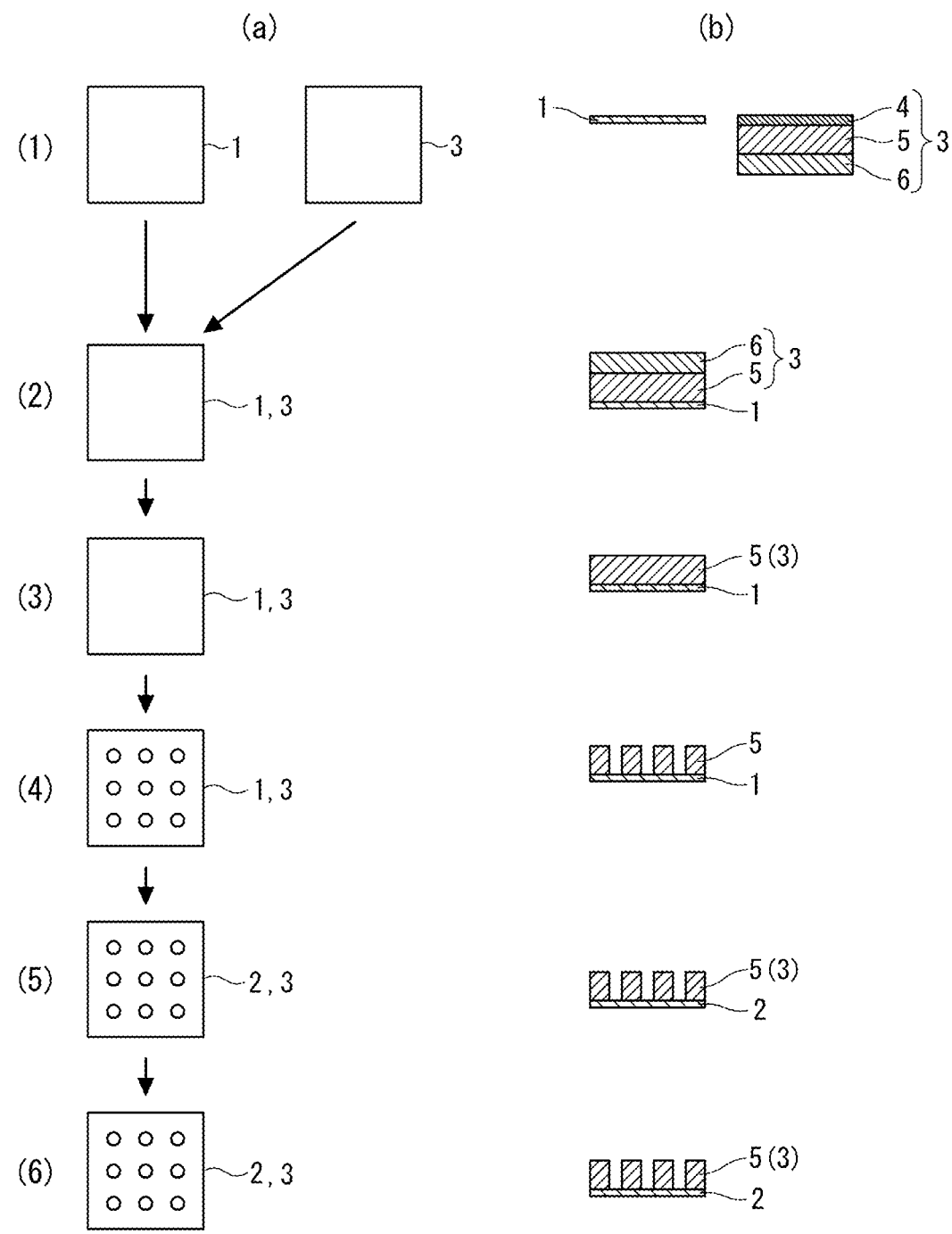
FIG. 1 is a drawing showing a method (steps) for producing a molded filter body according to a first embodiment of the present invention, (a) is a plan view, and (b) is a sectional view. Further, it is shown that (1) is at the start time, (2) is at the time of attaching graphite and a film resist, (3) is at the time of exposure of the film resist, (4) is at the time of development of the film resist, (5) is at the time of peeling the film resist and graphene from the graphite, and (6) is at the time of forming holes in the graphene.

As shown in FIG. 1(1), a film resist 3 made of a photoresist is used as a support for holding graphene in the molded filter body.

The performance required for the photoresist used here is to be durable enough to be used as a support, to be a negative type photoresist of which the solubility into a developer is lowered by exposure, and to be a resin having high heat resistance, such as a polyimide, or an epoxy resin.

In this embodiment, as a solder resist made of an epoxy resin, a film resist "RAYTEC" manufactured by Hitachi Chemical Co., Ltd., which is used for an insulating film of a printed board, or the like, is used.

RAYTEC is a film resist having a three-layer structure of a protective layer 4, a resist layer 5, and a support layer 6. The resist layer 5 is a layer composed of a solder resist made of an epoxy resin. The support layer 6 is formed on one surface of the resist layer 5, and protects the resist layer 5. The protective layer 4 is attached to the other surface of the resist layer 5, and plays a role of protecting the resist layer 5 until the resist layer 5 is attached to graphite 1. The protective layer 4 and the support layer 6 can each be peeled off from the resist layer 5 by picking by hand.

A thicker film resist 3 is easier to be used as a filter. Therefore, it is preferred to use as thick a film resist as possible. In this embodiment, RAYTEC (model number: FZ-2730GA) having a film thickness of 30 μm is used.

As shown in FIG. 1(2), in order to form a molded filter body, firstly, a film resist 3 is attached to a clean surface of a basal surface of graphite 1.

In order to remove the air between the film resist 3 and the graphite 1, and to firmly attach the film resist 3 and the graphite 1 to each other by pressing, a vacuum laminator is used for the attaching. For example, a laminator for a semiconductor process, such as MVLP-600 manufactured by MEIKI Co., Ltd. is most suitably used, but a laminator for domestic use, or a simple type laminator may be used.

The protective layer 4 of the film resist 3 is peeled off by hand, the resist layer 5 is placed on the clean surface of the graphite 1 so as to be in close contact with the clean surface, and put into a laminator film, and the laminator film is vacuum pressure-bonded for 20 seconds at −50 kPa with a vacuum laminator.

This step is performed in a yellow room in order to prevent the film resist 3 from being exposed.

Next, the graphite 1 and the film resist 3 are taken out from the laminator film, pressurized at 0.4 MPa while heating for 40 seconds on a hot plate heated to 80° C., and then allowed to cool naturally to room temperature. In this step, the resist layer 5 bonds to the graphite 1.

After that, the resultant matter is left to stand at 25° C. for 15 minutes. By setting the film resist 3 (resist layer 5) here, the exposure described later can be performed uniformly.

These steps are also performed in a yellow room in order to prevent the film resist 3 from being exposed.

Next, as shown in FIG. 1(3), by exposing the film resist 3, the resist layer 5 of the film resist 3 is stabilized so as not to be dissolved in a solvent.

In the exposure step, irradiation is performed at 180 $mJ/cm^2$ with an i-line stepper using a high-pressure mercury lamp. For example, EXP-2031 manufactured by ORC MANUFACTURING CO., LTD. can be used.

In addition, at this time, by masking apart of the surface of the film resist 3 with chromium, the part covered with the mask is not exposed and removed by the development described later. Therefore, the support water passage holes can be formed in the film resist 3.

For example, circular chromes each having a diameter of 500 μm are arranged on the upper, lower, left, and right so that the distance between the centers of the circular chromes is to have a pitch of 1000 μm, and a gap of at least 500 μm is formed between the circular chromes (see FIG. 1(a)(4)).

After the exposure, the exposed matter is left to stand at 25° C. for around 30 minutes.

Next, the support layer 6 of the film resist 3 is peeled off by hand to expose the resist layer 5.

These steps are also performed in a yellow room in order to prevent unnecessary exposure of the film resist 3.

Next, as shown in FIG. 1(4), the film resist 3 is developed. By using a 1% sodium carbonate aqueous solution at 30° C. as the developing solution, the development is performed for 80 seconds at 0.16 MPa spray pressure. After the development, washing with ultra-pure water for 80 seconds at 0.12 MPa spray pressure is repeated three times.

In the development step, for example, a fully automatic single wafer processing type developing device manufactured by TOKYO OHKA KOGYO CO., LTD. can be used.

In this way, the part masked at the time of the development in the resist layer 5 of the film resist 3 is washed away, and support water passage holes are formed.

These steps are also performed in a yellow room in order to prevent the film resist 3 from being exposed.

Instead of forming support water passage holes in the resist layer 5 by such photolithography, the support water passage holes are bored in advance in the film resist 3 (resist layer 5) at the stage of preparing the film resist 3, and then the film resist 3 may be attached to the graphite 1.

As a method for boring the support water passage holes in advance in the film resist 3, a method using a biopsy trepan, or the like can be employed.

Next, the graphite 1 and the film resist 3 are placed in a clean oven kept at 160° C. in advance and heated for 1 hour. By this heating step, polymerization of the resist layer 5 progresses, the film resist 3 is cured and chemically stabilized.

After that, as shown in FIG. 1(5), the film resist 3 is peeled off from the graphite 1 by using tweezers.

At this time, the layer of graphene 2 being attached to the surface of the resist layer 5 is peeled off from the graphite 1 together with the resist layer 5.

Since there may be a case where the layer of graphene 2 attached to the resist layer 5 is laminated with a desired thickness or more, sticking Scotch tape (registered trademark, manufactured by 3M Company) on the surface of the graphene 2 and peeling the Scotch tape off are repeated as needed. The graphene can be peeled off little by little in the work of sticking and peeling Scotch tape. Therefore, the layer of graphene 2 can be adjusted to the required thickness.

The thickness of the layer of graphene 2 can be confirmed as the color difference by an optical microscope. Therefore, the thickness can be adjusted while checking the thickness.

As the layer of graphene 2 thus obtained, a single layer is preferred, but several layers may be accepted.

In this way, the step of peeling the resist layer 5 and the graphene 2 attached to the resist layer 5 from the graphite 1 is not limited to this time point.

For example, the resist layer 5 may be peeled off from the graphite 1 before exposing the resist layer 5 after attaching the film resist 3 to the graphite 1. Further, after exposing the resist layer 5, the resist layer 5 may be peeled off from the graphite 1 before the development. Furthermore, after developing the resist layer 5, the resist layer 5 may be peeled off from the graphite 1 before heating at 160° C. for 1 hour.

Next, as shown in FIG. 1(6), graphene water passage holes for allowing water to pass through the graphene 2 are formed. These graphene water passage holes are required to have a size with which water can be allowed to pass through, but impurities and ions cannot be allowed to pass through.

The hole boring is performed by heating for a predetermined time in the air at 160 to 250° C.

In the present specification, the expression "in the air" is not limited to a mixed gas of around 20% $O_2$ and around 80% $N_2$. Other contained gases are not limited as long as 1% or more of $O_2$ is contained, and a mixed gas containing a rare gas and other gases is widely accepted.

Conventionally, it has been considered that the boring of graphene 2 is not generated at a low temperature of less than 300° C.

However, the film resist 3 is not broken at a low temperature of 160 to 250° C., and the hole gradually slowly opens in the graphene 2 and spreads. Therefore, depending on the length of the heating time, the size of the graphene water passage hole can be controlled. In addition, when the graphene water passage holes are opened in the air at 200 to 250° C., cinders are not generated. Therefore, the graphene water passage holes can be opened while keeping the clean surface.

When the temperature is less than 160° C., almost no holes can be formed in the graphene 2 even if the heating is performed for a long time. Further, when the temperature is 250° C. or more, the reaction becomes rapid, and it is difficult to control the holes to a desired size, and the sizes of the holes become nonuniform.

Moreover, the temperature for low-temperature heating is preferably set to 200 to 250° C. in particular.

For example, when the graphene 2 is placed in the air at 200° C. for 20 hours to form graphene water passage holes, the molded filter body produced in this way can remove salt from sea water to generate fresh water.

In addition, the expression "predetermined time" is referred to as the time to bring about the effect of forming graphene water passage holes in graphene 2 in a state of maintaining the atmosphere at 160 to 250° C.

In addition, as the support, the film resist 3 is used in the above-described Example, but any material can be used as long as the material does not affect the low temperature heating treatment of the graphene 2 and can support the graphene 2 as a filter. For example, a resin or other materials having adhesiveness to graphene 2 may be used as a support, or a resin or other supports and a heat-resistant pressure-sensitive adhesive may be used in combination or the like.

Figure 8:
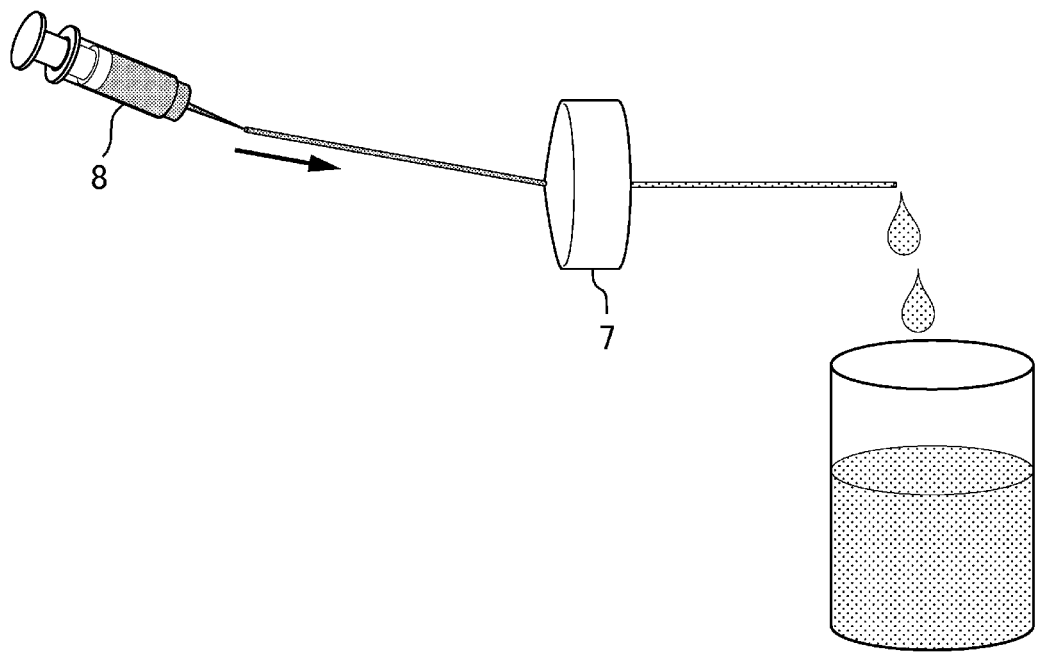
FIG. 8 is an explanatory drawing showing the use method of a molded filter body according to the embodiments of the present invention.

As shown in FIG. 8, the molded filter body thus produced can be used as a filter of a water purification device using a membrane filter.

For example, the molded filter body is cut out into a ½-inch circular shape using a craft punch (manufactured by Carl Jimuki Co., Ltd., or the like). The molded filter body is attached to the downstream side of a ½-inch membrane filter, with the resist layer 5 of this molded filter body directed to the upstream side, and with the layer of graphene 2 directed to the downstream side, and set to a membrane filter holder 7.

As the membrane filter, for example, "Isopore GTTP" (having a pore diameter of 0.2 μm) manufactured by Merck KGaA, which is a polycarbonate membrane filter, can be used.

As the membrane filter holder 7, for example, "Swinnex" manufactured by Merck KGaA can be used.

In order to filter a solution using such a water purification device, a solution (such as seawater) to be filtered is put in a syringe 8, and the syringe 8 is connected to the membrane filter holder 7, and by pushing the syringe 8 and filtering the solution, water from which impurities and ions have been removed can be obtained.

In the first embodiment, by holding graphene 2 by heating at a low temperature for a predetermined time in the air containing oxygen at 160 to 250° C., and forming graphene water passage holes, the reaction becomes mild and the control becomes easy, and holes having a desired size can be formed uniformly in the graphene 2 by controlling the length of the heating time. Further, by heating the graphene 2 at a low temperature, the damage of the support can be prevented. Therefore, the fouling of the graphene 2 can also be prevented.

In addition, as the support, by attaching a film resist 3 made of a negative type photoresist to graphene 2, a molded filter body can be formed without passing through a transfer process that causes the damage of the graphene 2.

Further, by using a technique of photolithography in which a mask is applied to a part where support water passage holes are to be formed in the film resist 3, and the other part is exposed, the size and shape of the support water passage holes to be formed in the film resist 3 can be controlled in detail. In this way, while increasing the strength as a support, support water passage holes having a degree of little influence on the ability of the graphene 2 as a filter can be formed in the film resist 3.

<Second Embodiment>

It is characterized in that instead of using a film resist 3 made of a negative type photoresist as in the first embodiment, a negative type liquid resist is spin-coated on a surface of graphite 1 to form a resist layer 5 in the second embodiment.

Further, also in the second embodiment, graphite 1 similar to that in the first embodiment is prepared, and the clean surface is exposed with Scotch tape.

Figure 2:
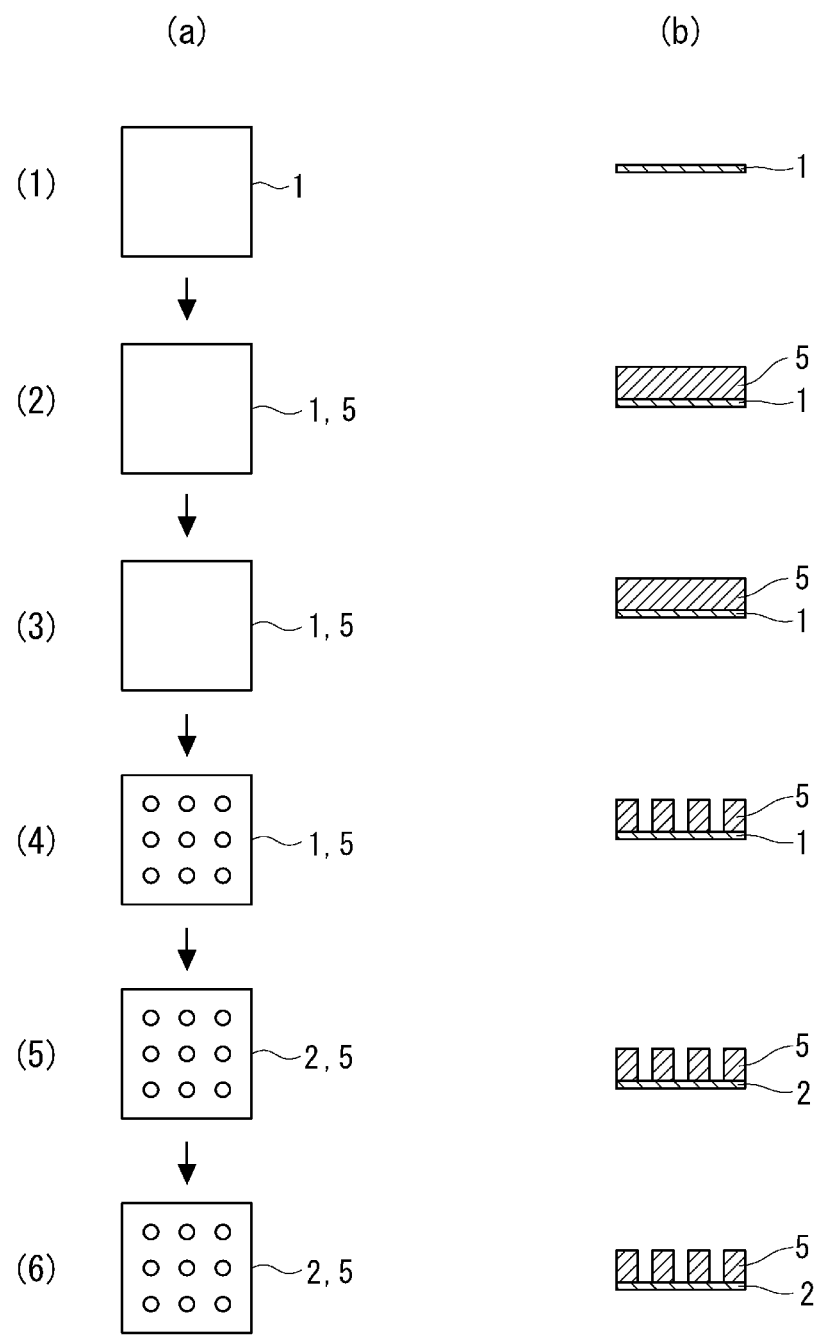
FIG. 2 is a drawing showing a method (steps) for producing a molded filter body according to a second embodiment of the present invention, (a) is a plan view, and (b) is a sectional view. Further, it is shown that (1) is at the start time, (2) is at the time of spin coating a liquid resist, (3) is at the time of exposure of the resist layer, (4) is at the time of development of the resist layer, (5) is at the time of peeling the resist layer and graphene from the graphite, and (6) is at the time of forming holes in the graphene.

In the second embodiment, firstly, as shown in FIG. 2(2), a resist layer 5 is formed on the clean surface of the graphite 1.

It is desired that the resist has the similar performance as that of the first embodiment except for being a liquid resist.

As such a liquid resist, SU-8 3050 manufactured by MicroChem Corp., which is an epoxy-based resin, is used.

Using a spin coater, a liquid resist is spin-coated at 3000 rpm for 20 seconds to form a resist layer 5 with a thickness of 50 μm on the graphite 1.

After the spin coating, soft baking is performed at 95° C. for 20 minutes using a hot plate to cure the resist layer 5.

These steps are performed in a yellow room in order to prevent the resist layer 5 from being exposed.

Next, as shown in FIG. 2(3), the resist layer 5 is exposed and stabilized.

The resist layer 5 is irradiated at 200 mJ/cm$^2$ with an i-line stepper (EXP-2031 manufactured by ORC MANUFACTURING CO., LTD.) using a high-pressure mercury lamp.

In a similar manner as in the first embodiment, by masking a part of the surface of the resist layer 5 with chromium, support water passage holes are formed (see FIG. 2(a)(4)).

After the exposure, the exposed matter is soft baked at 65° C. for around 5 minutes. At this time, the resin is polymerized, and the exposed part is not dissolved even when developed.

These steps are also performed in a yellow room in order to prevent unnecessary exposure of the resist layer 5.

After the exposure, the exposed matter is left to stand at 25° C. for around 30 minutes.

Next, as shown in FIG. 2(4), the resist layer 5 is developed.

For the development, SU-8 Developer manufactured by MicroChem Corp. is used.

SU-8 Developer is put in a tray in which the resist layer 5 has been placed, and the tray is swung for around 8 minutes. Since the SU-8 Developer is an organic solvent, the work is performed in a draft.

After the development, the resist layer 5 is immersed in newly prepared SU-8 Developer, swung for around 10 seconds, and then immersed in IPA and swung for around 10 seconds. After that, the resist layer 5 and the graphite 1 are taken out, and dried.

In this way, the part masked at the time of the development in the resist layer 5 is washed away, and support water passage holes are formed.

These steps are also performed in a yellow room in order to prevent the resist layer 5 from being exposed.

As shown in FIGS. 2(5) and 2(6), the steps from the step of peeling the resist layer 5 and the layer of graphene 2 from the graphite 1 to the step of forming the graphene water passage holes in the graphene 2 are performed in a similar manner as in the first embodiment.

The relationship between before and after the step of peeling the resist layer 5 and the layer of graphene 2 from the graphite 1 can also be changed in a similar manner as in the first embodiment.

Further, in the second embodiment, by spin coating the graphite 1 with a liquid resist made of a negative type photoresist to form a resist layer 5 as a support, a molded filter body can be formed without passing through a transfer process that causes the damage of the graphene.

In addition, by using a technique of photolithography in which a mask is applied to a part where support water passage holes are to be formed in the resist layer 5, and the other part is exposed, the size and shape of the support water passage holes to be formed in the film resist can be controlled in detail.

<Third Embodiment>

In the first embodiment, the graphite 1 is attached to the film resist 3 and the graphene 2 is peeled off, and then graphene water passage holes are formed in the graphene 2.

However, in the third embodiment, before attaching the graphite 1 to the film resist 3, graphene water passage holes are formed in the graphite 1.

Figure 3:
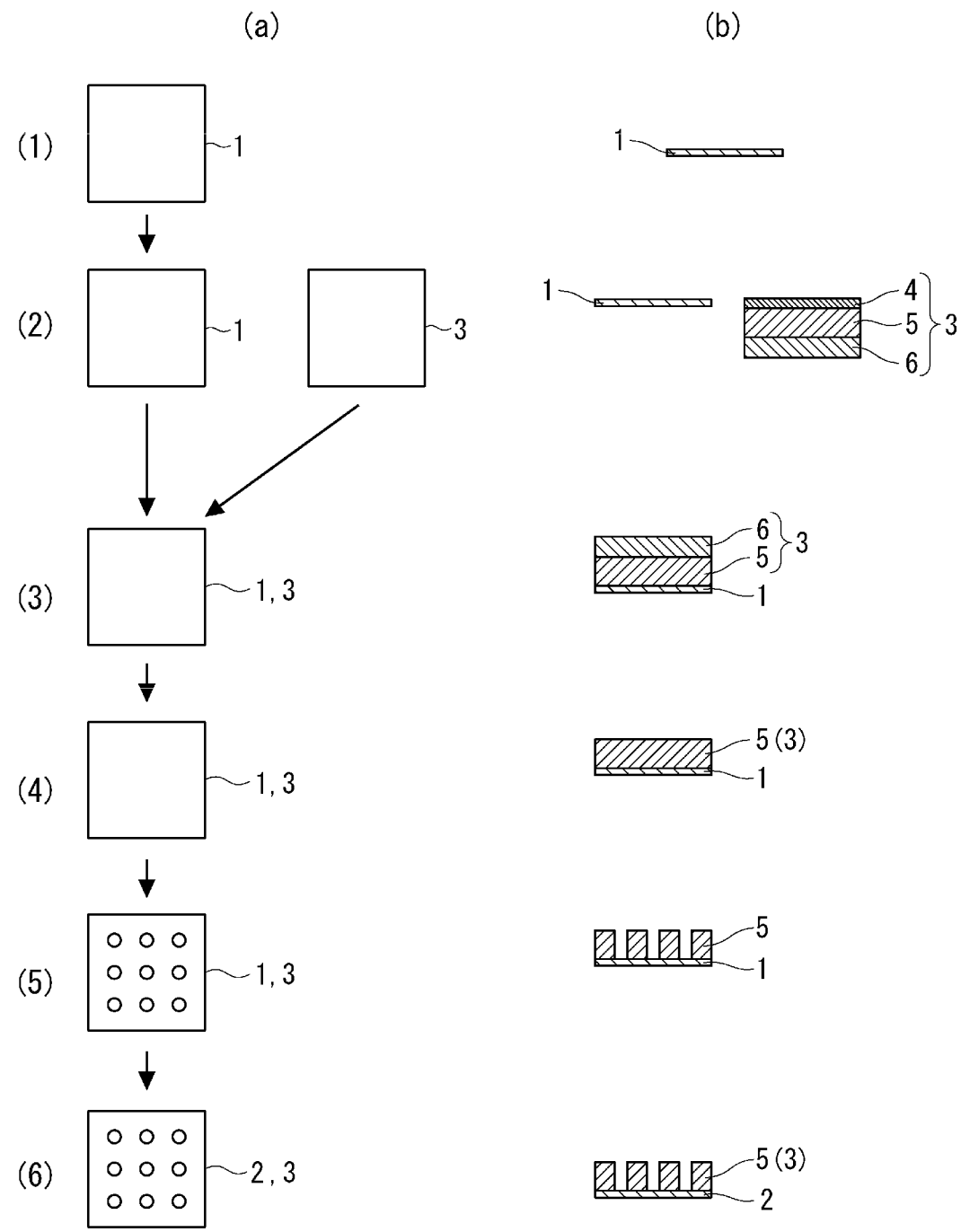
FIG. 3 is a drawing showing a method (steps) for producing a molded filter body according to a third embodiment of the present invention, (a) is a plan view, and (b) is a sectional view. Further, it is shown that (1) is at the time of forming holes in graphite, (2) and (3) are at the time of attaching the graphite and a film resist, (4) is at the time of exposure of the resist layer, (5) is at the time of development of the resist layer, and (6) is at the time of peeling the film resist and graphene from the graphite.

In the third embodiment, firstly, as shown in FIG. 3(1), graphene water passage holes are formed in the graphite 1.

A calcium nitrate ethanol solution is spin-coated on a clean surface of the basal surface of graphite 1 by using a spin coater, and then dried at 100° C. After that, when the resultant dried matter is heated under an atmosphere of inert gas at 300° C. for 10 minutes by using a muffle furnace, carbon atoms of the graphite 1 are oxidized by oxygen atoms in the calcium nitrate.

In this way, graphene water passage holes can be formed in the graphene 2 of the upper several layers on the basal surface of the graphite 1.

In addition to a nitrate, a hydrochloride, a sulfate, a carbonate or the like may be used to spin coat the graphite 1 to form graphene water passage holes.

Among them, a nitrate and a carbonate which are decomposed and removed by a heat treatment are preferred to a sulfate and a hydrochloride which remain in the graphite 1 and are difficult to be removed.

The metal contained in the salt may be any of an alkali metal, an alkaline earth metal, a lanthanide, and a transition metal.

However, the graphite 1 is used as a filter for water. Therefore, it is preferred that a lanthanide and a heavy metal are excluded with an emphasis on safety. Further, from the viewpoint of the easiness of the removal in a case of being left in the graphite 1, a salt using an alkali metal or an alkaline earth metal rather than a transition metal is preferred.

In addition, as a method for forming graphene water passage holes in the graphite 1, in addition to this, a physical measure of a method of irradiating the basal surface of the graphite 1 with a focused ion beam (FIB), a method by a plasma treatment, or the like may be employed.

Next, as shown in FIGS. 3(2) and 3(3), the protective layer 4 of the film resist 3 is peeled off by hand, the resist layer 5 is placed on the basal surface, in which graphene water passage holes have been formed, of the graphite 1 so as to be in close contact with the basal surface, put into a laminator film, and the laminator film is vacuum pressure-bonded for 20 seconds at −50 kPa with a vacuum laminator.

This step is performed in a yellow room in order to prevent the film resist 3 from being exposed.

Next, the graphite 1 and the film resist 3 are taken out from the laminator film, pressurized at 0.4 MPa while heating for 40 seconds on a hot plate heated to 80° C., and then allowed to cool naturally to room temperature. In this step, the resist layer 5 bonds to the graphite 1.

After that, the resultant matter is left to stand at 25° C. for 15 minutes. By setting the film resist 3 (resist layer 5) here, the exposure described later can be performed uniformly.

These steps are also performed in a yellow room in order to prevent the film resist 3 from being exposed.

Next, as shown in FIG. 3(4), the resist layer 5 is exposed and stabilized.

The resist layer 5 is irradiated at 200 mJ/cm$^2$ with an i-line stepper (EXP-2031 manufactured by ORC MANUFACTURING CO., LTD.) using a high-pressure mercury lamp.

In a similar manner as in the first embodiment, by masking a part of the surface of the resist layer 5 with chromium, support water passage holes are formed (see FIG. 3(5)).

After the exposure, the exposed matter is soft baked at 65° C. for around 5 minutes. At this time, the resin is polymerized, and the exposed part is not dissolved even when developed.

These steps are also performed in a yellow room in order to prevent unnecessary exposure of the film resist 3.

After the exposure, the exposed matter is left to stand at 25° C. for around 30 minutes.

After that, the support layer 6 of the film resist 3 is peeled off by hand to expose the resist layer 5.

Next, as shown in FIG. 3(5), the film resist 3 is developed.

By using a 1% sodium carbonate aqueous solution at 30° C. as the developing solution, the development is performed for 80 seconds at 0.16 MPa spray pressure. After the development, washing with ultra-pure water for 80 seconds at 0.12 MPa spray pressure is repeated three times.

In the development step, for example, a fully automatic single wafer processing type developing device manufactured by TOKYO OHKA KOGYO CO., LTD. can be used.

In this way, the part masked at the time of the development in the resist layer 5 of the film resist 3 is washed away, and support water passage holes are formed.

These steps are also performed in a yellow room in order to prevent the film resist 3 from being exposed.

Instead of forming support water passage holes in the resist layer 5 by such photolithography, the support water passage holes are bored in advance in the film resist 3 (resist layer 5) at the stage of preparing the film resist 3, and then the film resist 3 may be attached to the graphite 1.

As a method for boring the support water passage holes in advance in the film resist 3, a method using a biopsy trepan or the like can be employed.

Next, the graphite 1 and the film resist 3 are placed in a clean oven kept at 160° C. in advance and heated for 1 hour. By this heating step, polymerization of the resist layer 5 progresses, and the film resist 3 is cured and chemically stabilized.

After that, as shown in FIG. 3(6), the film resist 3 is peeled off from the graphite 1 by using tweezers.

At this time, the layer of graphene 2 being attached to the surface of the resist layer 5 is peeled off from the graphite 1 together with the resist layer 5.

Since there may be a case where the layer of graphene 2 attached to the resist layer 5 is laminated with a desired thickness or more, sticking Scotch tape (registered trademark, manufactured by 3M Company) on the surface of the graphene 2 and peeling the Scotch tape off are repeated as needed. The graphene can be peeled off little by little in the work of sticking and peeling Scotch tape. Therefore, the layer of graphene 2 can be adjusted to the required thickness.

The thickness of the layer of graphene 2 can be confirmed as the color difference by an optical microscope. Therefore, the thickness can be adjusted while checking the thickness.

As the layer of graphene 2 thus obtained, a single layer is preferred, but several layers may be accepted.

In this way, the step of peeling the resist layer 5 and the graphene 2 attached to the resist layer 5 from the graphite 1 is not limited to this time point.

For example, the resist layer 5 may be peeled off from the graphite 1 before exposing the resist layer 5 after attaching the film resist 3 to the graphite 1. Further, after exposing the resist layer 5, the resist layer 5 may be peeled off from the graphite 1 before the development. Furthermore, after developing the resist layer 5, the resist layer 5 may be peeled off from the graphite 1 before heating at 160° C. for 1 hour.

In the third embodiment, graphene water passage holes have already been formed in the graphene 2 attached to the resist layer 5. However, when the size of the graphene water passage holes is made larger, after that, low temperature heating may be performed in the air at 160 to 250° C. until the size becomes an arbitrary size.

In the third embodiment, graphene water passage holes are formed in a layer of graphene 2 on a surface of graphite 1, and then the resultant layer is attached to the film resist 3, and by peeling the resist layer 5 from the graphite 1 in a state of attaching the layer of the graphene 2 to the resist layer 5, a molded filter body having graphene water passage holes can be easily formed.

In addition, by attaching a film resist 3 made of a negative type photoresist to graphene 2 as a support, a molded filter body can be formed without passing through a transfer process that causes the damage of the graphene 2.

Further, by using a technique of photolithography in which a mask is applied to a part where support water passage holes are to be formed in the film resist 3, and the other part is exposed, the size and shape of the support water passage holes to be formed in the film resist 3 can be controlled in detail.

<Test>

A test was performed to measure the effect of the present invention.

For the measurement test, single-walled carbon nanohorn (SWNH) is used. SWNH has the same basic structure as that of graphene, but is formed into a conical shape.

In this test, the adsorbed amount of nitrogen at 77 K was measured by using an adsorption measuring device, Autosorb-iQ manufactured by Quantachrome Instruments Japan G.K. Nitrogen gas is supplied to the outside of SWNH, and after a predetermined time, the amount of nitrogen gas is measured. In a case where there are holes through which nitrogen can pass on the circumferential surface of SWNH, since nitrogen enters inside the SWNH and adsorbs to the inner wall, the nitrogen adsorption is found by the difference between the amount of the nitrogen supplied and the amount of the nitrogen outside the SWNH after the test, and the diameter and the number of the holes can be grasped.

Figure 4:
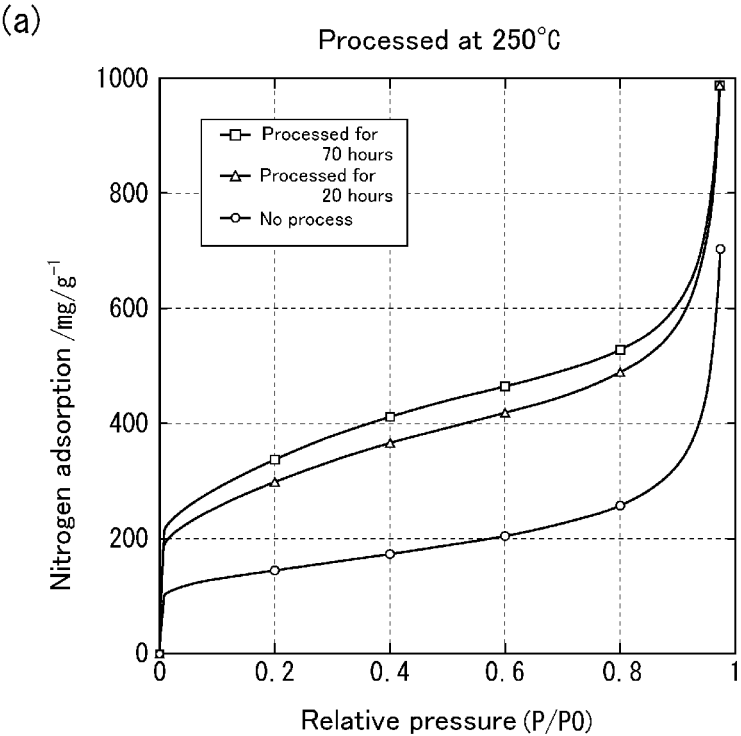
FIG. 4 is graphs showing the test results of the measurement of the nitrogen adsorption of SWNH in a graphene structure, (a) is a graph showing the test results with the use of the SWNH processed at 250° C., and (b) is a graph showing the test results with the use of the SWNH processed at 200° C.
Figure 4:
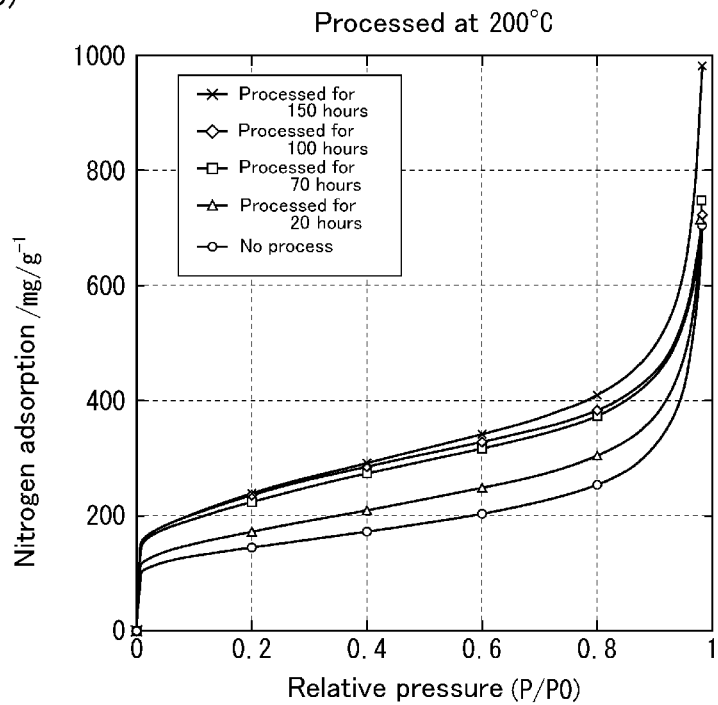

In FIG. 4(a), SWNH that had not been processed, SWNH that had been processed for 20 hours in the air at 250° C., and SWNH that had been processed for 70 hours in the air at 250° C. were prepared, and for each of them, nitrogen was supplied while changing the relative atmospheric pressure, and the nitrogen adsorption was measured.

With the SWNH that had been processed for 20 hours, the nitrogen adsorption has largely increased at from low pressure to high pressure as compared with the SWNH that had not been processed, and it is understood that holes through which nitrogen passes are formed.

In addition, the adsorbed amount of the SWNH that had been processed for 70 hours was increased as compared with that of the SWNH that had been processed for 20 hours, and this means that the number of the SWNH in which holes are opened has increased. That is, this is because the number of the formed holes increases, and as a result the proportion of the SWNH in which holes are opened increases, and the adsorbed amount is increased. Accordingly, it is understood that the number of the holes has increased.

In FIG. 4(b), SWNH that had not been processed, SWNH that had been processed for 20 hours in the air at 200° C., SWNH that had been processed for 70 hours in the air at 200° C., SWNH that had been processed for 100 hours in the air at 200° C., and SWNH that had been processed for 150 hours in the air at 200° C. were prepared, and for each of them, nitrogen was supplied while changing the relative atmospheric pressure, and the nitrogen adsorption was measured.

When the SWNH is processed at 200° C., although the amount is not as much as when processed at 250° C., the carbon adsorption is increased as the processing time is prolonged. That is, it can be understood that as the processing time is longer, the number of holes is increased.

Figure 5:
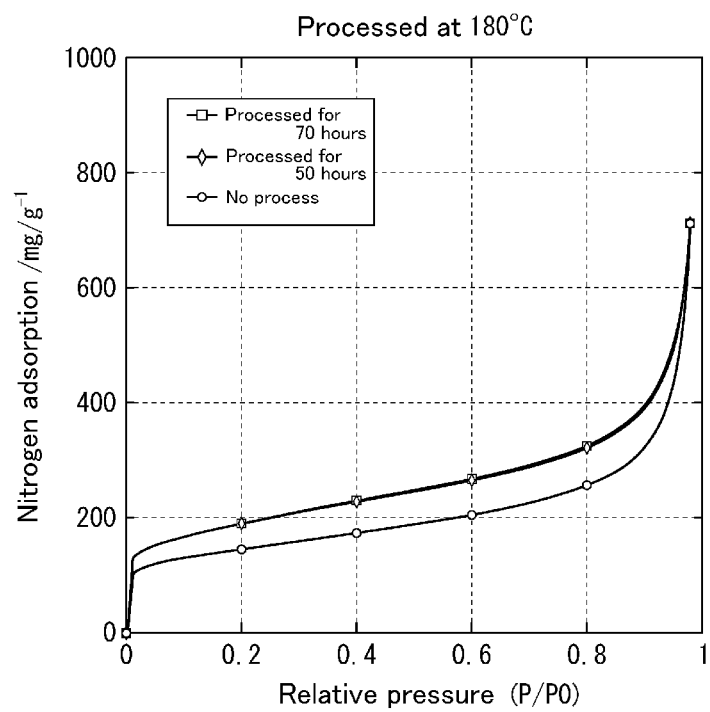
FIG. 5 is a graph showing the test results of the measurement of the nitrogen adsorption of the SWNH processed at 180° C.

In FIG. 5, SWNH that had not been processed, SWNH that had been processed for 20 hours in the air at 180° C., and SWNH that had been processed for 70 hours in the air at 180° C. were prepared, and for each of them, nitrogen was supplied while changing the relative atmospheric pressure, and the nitrogen adsorption was measured.

With the SWNH that had been processed for 50 hours, the nitrogen adsorption has increased at from low pressure to high pressure as compared with the SWNH that had not been processed, and it is understood that holes through which nitrogen passes are formed.

On the other hand, with the SWNH that had been processed for 70 hours, the nitrogen adsorption has not been substantially increased as compared with that of the SWNH that had been processed for 50 hours. Accordingly, it was found that the number of holes is hardly increased at 180° C. even if the processing time is increased.

Next, for the graphene in which holes are formed, the ion selectivity is measured.

Since the hydrated ionic radius of the cation is $Li^+>Na^+>K^+>Rb^+>Cs^+$, the ion selectivity of the filter using graphene is measured according to the permeability of each ion.

Figure 6:
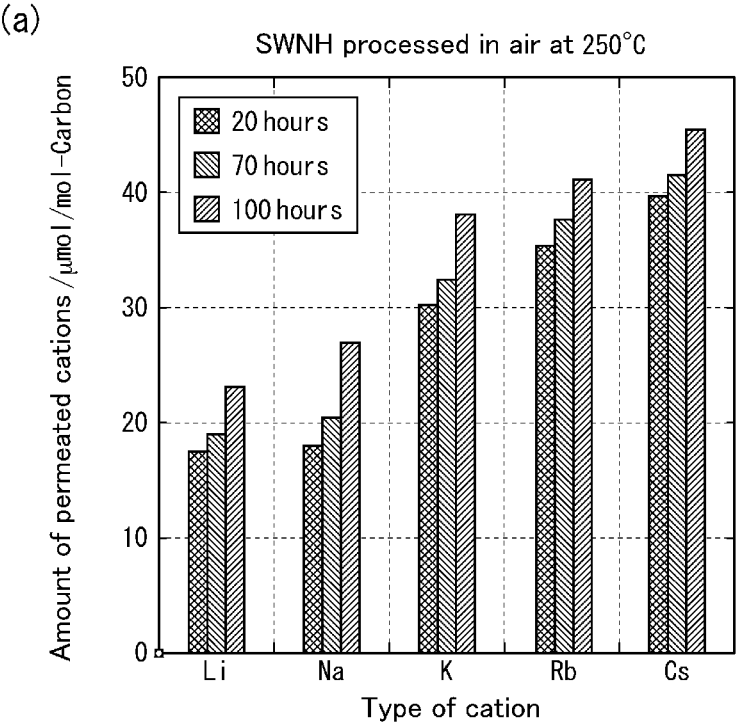
FIG. 6 is graphs showing the test results of the measurement of each amount of the ions permeating the holes formed in the SWNH, (a) is a graph showing the test results with the use of the SWNH processed at 250° C., and (b) is a graph showing the test results with the use of the SWNH processed at 200° C.
Figure 6:
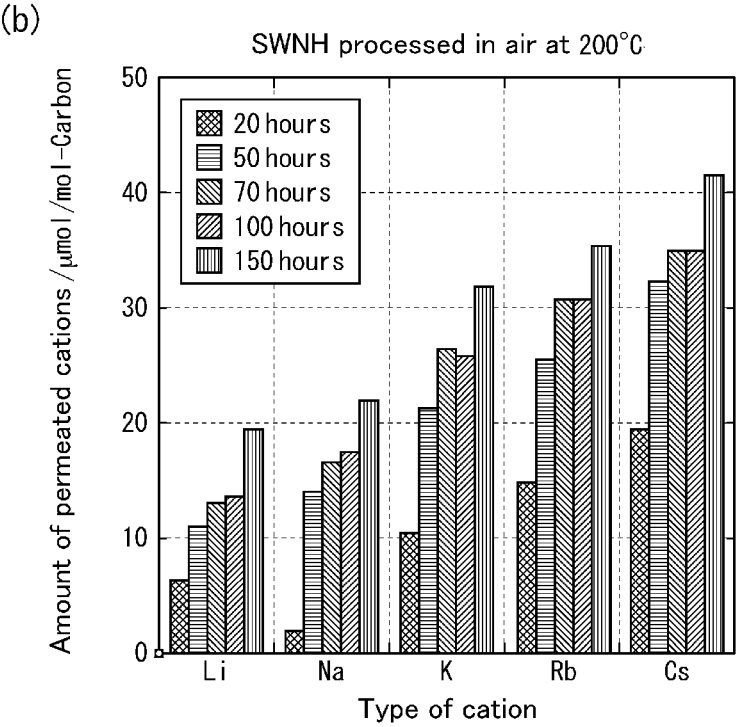

In the test, 24 mg of SWNH was placed into 6 mL of a Li, Na, K, Rb, and Cs mixed solution at 20 μmol/L, and the resultant mixture was left to stand at 30° C. for 24 hours, and then the ion concentration of the mixture was measured by an ion chromatography. If cations adhere to the inside of SWNH through the holes opened in the SWNH, the measured ion concentration is lowered. FIGS. 6(*a*) and 6(*b*) show the measurement results of the amount of the ions permeated the holes from the concentration change.

In FIG. 6(*a*), SWNH that had been processed for 20 hours in the air at 250° C., SWNH that had been processed for 70 hours in the air at 250° C., and SWNH that had been processed for 100 hours in the air at 250° C. were prepared, and placed into a mixed solution.

As a result, it is understood that all of the cations are permeated irrespective of the length of the processing time. Accordingly, it was found that when SWNH is processed at 250° C. for 20 hours or more, the holes formed in the SWNH become larger and the SWNH does not have ion selectivity.

In FIG. 6(*b*), SWNH that had been processed for 20 hours in the air at 200° C., SWNH that had been processed for 50 hours in the air at 200° C., SWNH that had been processed for 70 hours in the air at 200° C., SWNH that had been processed for 100 hours in the air at 200° C., and SWNH that had been processed for 150 hours in the air at 200° C. were prepared, and placed into a mixed solution.

As a result, it was found that with the SWNH that had been processed for 20 hours, ions having a large hydrated ionic radius such as Li ions and Na ions are hardly permeated, and ions having a small hydrated ionic radius such as K ions, Rb ions, and Cs ions are permeated.

On the other hand, it was found that with the SWNH that had been processed for 50 hours or more, the holes become larger, and all of the ions are permeated.

Figure 7:
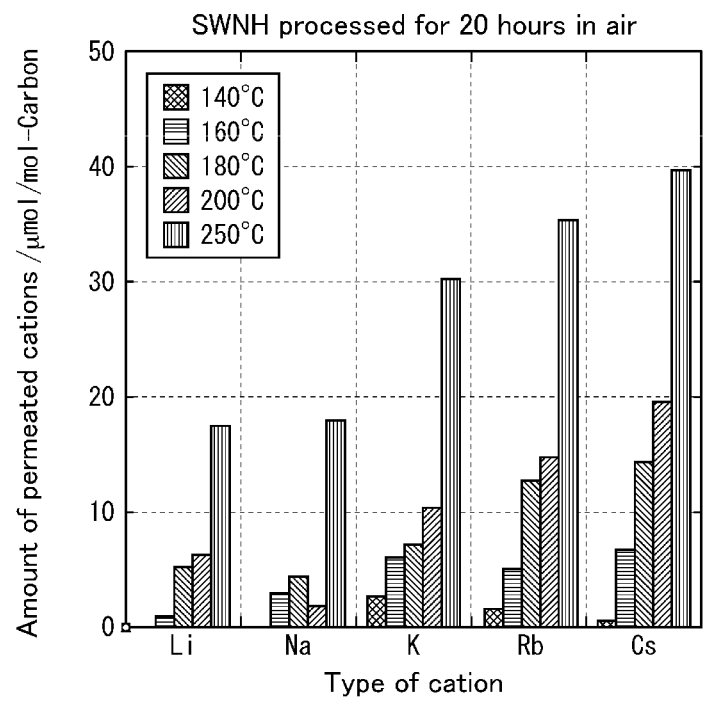
FIG. 7 is a graph showing the test results of the measurement of each amount of the ions permeating the holes formed in the SWNH, comparing for each temperature at which the SWNH has been heated.

FIG. 7 shows the comparison of ion selectivity for each heating temperature by unifying the processing time to 20 hours.

SWNH that had been processed for 20 hours in the air at 140° C., SWNH that had been processed for 20 hours in the air at 160° C., SWNH that had been processed for 20 hours in the air at 180° C., SWNH that had been processed for 20 hours in the air at 200° C., and SWNH that had been processed for 20 hours in the air at 250° C. were prepared, and placed into a mixed solution.

It is understood that with the SWNH that had been processed at 140° C., holes are not substantially opened, and ions are not substantially permeated.

It is understood that with the SWNH that had been processed at 160° C. and the SWNH that had been processed at 180° C., holes are small, and only the small amount of ions passes through. Further, it is understood that the permeation amounts of K, Rb, and Cs are also small, and the ion selectivity is not possessed.

It is understood that with the SWNH that had been processed at 200° C., the permeation amounts of Li and Na are small and the permeation amounts of K, Rb, and Cs are large, and the ion selectivity is possessed.

It is understood that with the SWNH that had been processed at 250° C., the permeation amounts of all of the ions are large.

Figure 9:
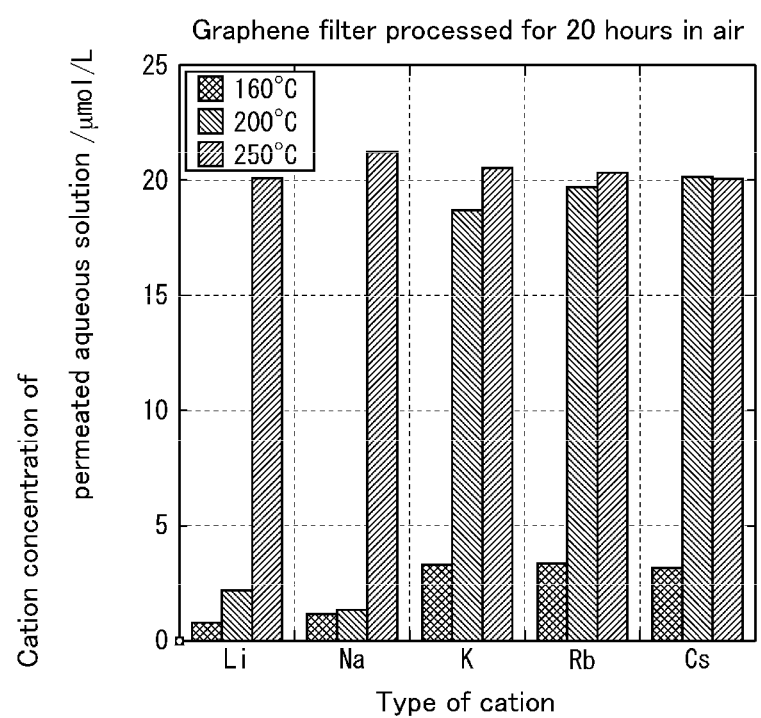
FIG. 9 is a graph showing the test results of the measurement of each amount of the ions permeating the holes formed in the graphene, comparing for each temperature at which the graphene has been heated.

In addition, in FIGS. 8 and 9, as described above, the molded filter body having the graphene 2 produced in the first embodiment was set in a membrane filter holder 7, the Li, Na, K, Rb and Cs mixed solution at 20 μmol/L was permeated from a syringe 8, and the ion concentration of the permeate was measured.

As the graphene, graphene that had been processed at 160° C. for 20 hours, graphene that had been processed at 200° C. for 20 hours, and graphene that had been processed at 250° C. for 20 hours were prepared.

As a result, as shown in FIG. 9, the graphene that had been processed at 160° C. had small holes, and was not allowed to permeate each of the ions substantially.

It was found that the graphene that had been processed at 200° C. was not allowed to permeate Li and Na substantially, and was allowed to permeate K, Rb, and Cs.

It was found that the graphene that had been processed at 250° C. had large holes, and was allowed to permeate all of the ions.

REFERENCE SIGNS LIST

1 Graphite
2 Graphene
3 Film resist
4 Protective layer
5 Resist layer
6 Support layer
7 Membrane filter holder
8 Syringe

The invention claimed is:

1. A method for producing a molded filter body having a layer of graphene as a filter medium, comprising the steps of:
   forming a layer of a support on a surface of graphite;
   forming support water passage holes in the layer of the support;
   peeling the layer of the support from the graphite in a state of attaching a layer of graphene on the surface of the graphite to the layer of the support; and
   holding the layer of graphene by heating at a low temperature for a predetermined time in air containing oxygen at 160 to 250° C. and forming graphene water passage holes.

2. The method for producing a molded filter body according to claim 1, wherein
the support is a negative type photoresist, and
the step of forming the support water passage holes in the layer of the support includes a step of exposing a part other than the part to form the support water passage holes of the photoresist.

3. The method for producing a molded filter body according to claim 1, wherein
the step of holding the layer of graphene by heating at a low temperature and forming the graphene water passage holes is performed in the air containing oxygen at 200 to 250° C.

4. A method for producing a molded filter body having a layer of graphene as a filter medium, comprising the steps of:
forming graphene water passage holes in a layer of graphene on a surface of graphite;
forming a layer of a support on a surface on which the layer of the graphene is present in the graphite;
forming support water passage holes in the layer of the support; and
peeling the layer of the support from the graphite in a state of attaching the layer of the graphene to the layer of the support.

* * * * *